United States Patent
Kimsa et al.

(10) Patent No.: US 10,936,526 B1
(45) Date of Patent: Mar. 2, 2021

(54) INTELLIGENT SENSOR SUITE(S) FOR PORTABLE PERSONAL CONTAINERS

(71) Applicants: Sol Eleonora Kimsa, Toronto (CA); Edward Alexis Kimsa-Rowntree, Toronto (CA)

(72) Inventors: Sol Eleonora Kimsa, Toronto (CA); Edward Alexis Kimsa-Rowntree, Toronto (CA)

( * ) Notice: Subject to any disclaimer, the term of this patent is extended or adjusted under 35 U.S.C. 154(b) by 0 days.

(21) Appl. No.: 16/550,178

(22) Filed: Aug. 24, 2019

Related U.S. Application Data (60) Provisional application No. 62/722,723, filed on Aug. 24, 2019.

(51) Int. Cl.
*G06F 13/40* (2006.01)
*G06F 3/14* (2006.01)

(52) U.S. Cl.
CPC ............ *G06F 13/4081* (2013.01); *G06F 3/14* (2013.01)

(58) Field of Classification Search
CPC combination set(s) only.
See application file for complete search history.

(56) References Cited

U.S. PATENT DOCUMENTS

| | | | |
|---|---|---|---|
| 5,067,063 A | 11/1991 | Granneman et al. | |
| 5,764,132 A | 6/1998 | Hill | |
| 6,120,162 A | 9/2000 | Guerrieri | |
| 6,637,909 B1 | 10/2003 | Bryan | |
| 7,111,959 B2 | 9/2006 | Kurcz et al. | |
| 8,147,086 B2 | 4/2012 | Tait | |
| 8,944,628 B2 | 2/2015 | Melamed | |
| 2002/0161652 A1* | 10/2002 | Paullin | B65D 79/00 705/22 |
| 2005/0043850 A1* | 2/2005 | Stevens | B65G 1/1378 700/213 |
| 2006/0061546 A1 | 3/2006 | Jong | |
| 2011/0170282 A1 | 7/2011 | Munoz | |
| 2014/0041772 A1 | 2/2014 | Hayes et al. | |
| 2016/0055451 A1* | 2/2016 | Waters | G01S 19/01 340/8.1 |
| 2017/0070078 A1* | 3/2017 | Hwang | H02J 7/34 |
| 2017/0346307 A1* | 11/2017 | Azam | A45C 15/00 |
| 2017/0365208 A1* | 12/2017 | Brooks | A45F 3/04 |
| 2018/0274974 A1* | 9/2018 | Wang | G01J 1/44 |

\* cited by examiner

*Primary Examiner* — Raymond N Phan (57) ABSTRACT

An adaptable technological suite upgrade for use in portable personal containers such as but not limited to purses, cases, packs etc. The modular solution facilitates organizational adaptability to each personal container's unique design giving installation options for aftermarket and/or time of manufacture. An electronic system, with one or more direct current storage devices with recharging assemblies, connecting a microcontroller (with one or more microprocessors) with: customizable illumination assemblies; a configurable sensor suite delivering small continuous packets of information to visual and/or auditory sensor displays; and a downloadable system management interface. The system may be triggered through one or more responsive switches, manual buttons, and/or interface control, and is turned off after a designated time of inactivity. Integral power access may pair with additional digital devices connecting via one or more modes. The system may transform the portable personal container to act as a smart object allowing for on-going personalization.

6 Claims, 8 Drawing Sheets

Figure 18B

INTELLIGENT SENSOR SUITE(S) FOR PORTABLE PERSONAL CONTAINERS

CROSS REFERENCE TO RELATED APPLICATIONS

This non-provisional patent application is based on U.S. provisional patent application No. 62/722,723 filed Aug. 24, 2018.

BACKGROUND OF INVENTION

Field of Invention

The present Invention relates to portable personal containers (such as but not limited to purses, bags, cases, packs, etc.) and more specifically an adaptable electronic technological upgrade giving the individual user a toolset to responsively control aspects and receive feedback on such attributes as illumination, connectivity, power, inventory etc.

Background

Individuals often need to carry multiple static and digital items in a portable personal container. The meaningful interactivity with and verification of personal items within a container can be repetitive and time consuming due to the nature of portable personal container use and space limitations. The individual is often frustrated to organize without light, function without power, and check and re-check physically to inventory vital contents.

BRIEF SUMMARY OF INVENTION

The present invention provides an adaptable technological suite upgrade system for portable personal containers comprising: An electronic system, with one or more direct current storage devices with recharging assemblies, a microcontroller (with one or more microprocessors) which through the use of one or several onboard communication protocols via near field communications such as but not restricted to, Wi-Fi, RFID, Bluetooth, a wired connection, and/or other protocols recognizes and communicates with components, devices and static items within and on the carrier and through communication with user devices allows personalization of components' affects.

The system may offer modular components such as but not limited to: interactive sensor suite(s) including visual and/or auditory display(s); positionable programmable illumination; accessible rechargeable power; various sensor suite display options; and a downloadable system management interface.

The microcontroller may allow wireless communication with user's own device(s), and through the system's management interface responds to user's input prompting switches to react strategically. The container comes to function as a smart object. The time needed for organization and validation is reduced and the personalization in function and décor creates a user friendly environment lessening frustration.

An overriding object of the new Adaptable Technological Suite is to offer a concise solution to the various aspects of organization and to simplify integration of the system with an individuals' existing container and its organizational design; and/or alternatively to function as a succinct technological modular addition at time of sale and/or manufacture.

An object of the adaptable technological suite upgrade is to provide positionable, programmable duty and/or decorative illumination where needed on the interior, exterior or both, of the portable personal container. In order to enhance organization the assembly may include 1 or more electric lights which may be/but are not restricted to; Electric Diodes: singles, strips, panels, clusters; Electroluminescent: panels or wires; Conductive and/or reflective materials and surfaces; etc.

Another object is to increase efficiency and replace repetitive tasks (such as inventorying vital items—static or digital—before each departure) with responsive customizable sensor suite display(s) which may include visual and/or auditory prompts inside, on and/or outside of the container.

Another object is facilitate daily necessities through such conveniences as accessible power charging and; sensor readouts displayed in, on or by the portable personal container.

Another key object is to give the user control over their organizational choices on an on-going basis through the management program interface which integrates with the user's digital devices.

Another object is to keep to the smallest energy footprint. The power storage devices include but are not limited to rechargeable batteries. The recharging capabilities may have but are not restricted to 1 or more magnetic, wireless, solar, or USB/MICRO systems. Responsive power switches such as but not limited to (Flexible, Magnetic, Digital etc.) allow for various configurations of energy efficiency options.

The adaptable technological suite upgrade features and their advantages are better understood from the descriptions and drawings following.

BRIEF DESCRIPTIONS OF SEVERAL VIEWS OF THE EMBODIMENTS

REFERENCE CHARACTERS

Wherever possible, the same reference numbers are used in the drawings when indicating the same or similar parts.

20. Core box—microprocessors with integrated power source(s).
21. Digital sensor display.
22. Multi light sensor display.
23. LED illumination strip.
24. Flex sensor.
25. RFID antennae and identification discs markers.
26. Magnetic sensor.
27. Power connector whips.
28A. Wireless sensor display core with chip set and integrated power.
28B. Wireless sensor display core with chip set and removable cell battery.
29. Installation Loop.
30. Wireless sensor display—battery recharge connector.
31. Installation rail—Velcro or other adhesive method.
32. Wireless sensor display back view—replacement battery access.
33. Replaceable battery cell.
34. Push button sensor display switch.
35. Wireless sensor display strap-feed clip.
36. Interface communication with user devices.
37. Visor aid.
38. Magnetic switch in box purse.

DETAILED DESCRIPTION OF INVENTION

While some embodiments may address one or more of the problems and deficiencies discussed above, it is possible that they may prove useful in addressing other problems and deficiencies in a number of technical areas. Accordingly, the following detailed description does not limit modifications adaptations and other possible implementations.

Figures 1, 2:
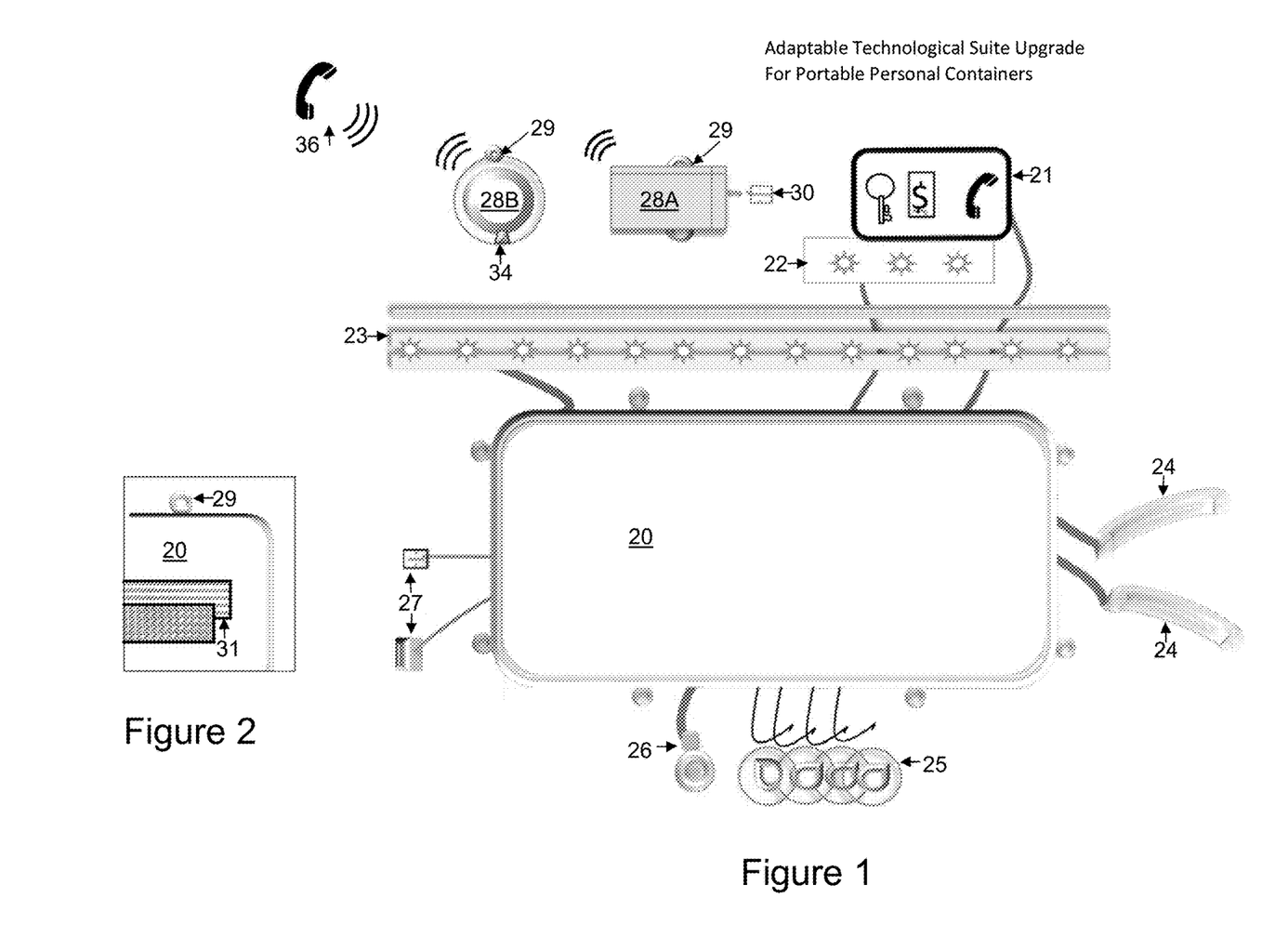
FIG. 1 Embodiment of an Adaptable Technology Suite system.
FIG. 2 Close-up of optional installation aids.

Beginning with FIG. 1, this embodiment of an Adaptable Technological Suite Upgrade for Portable Personal Containers includes: the core box 20, which may contain a microcontroller; one or more microprocessor(s); one or more integrated power source(s); and one or combination of sensor readers and adaptors such as but not limited to RFID, Bluetooth, or other means as may be defined. as needed; An electronic circuit (wired and/or wireless electronic transmission enabled) comprised of a number of electronic components for implementing the functionality described below. Functional components (customizable aspects accessible wirelessly via the management interface on user's device(s)*) may include but are not restricted to: Illumination component(s) such as but not limited to programmable LED strip(s) 23; Power supply component(s) such as but not limited to connector whips 27; Sensor suite component(s) which may include but are not restricted to RFID antennae and identification markers 25, Bluetooth chipsets; Sensor displays which may include but are not limited to LED digital screen(s) 21, indicator LED(s) 22, wired or wirelessly adapted 28A, 28B, display(s) in or on the carrier. Activation component(s) switch(s) may include but are not restricted to flex/touch 24, magnetic or/direct 26. *The system's management interface program component 36, affecting various aspects such as but not restricted to light settings 23, sensor display station(s) 21, 22, and other prompts as may be required by the user, is downloadable and allows communication wirelessly through the system microcontroller 20, via the user's digital device(s).

The central microprocessor(s) 20, performs fetch, decode, and execute program instructions to perform the functionality described herein, and facilitates communication with other devices 36, as described below. Program instructions may be part of an application or applications already installed on Random Access Memory (RAM) and/or an Electrically-Erasable Programmable Read-Only Memory (EEPROM). The microprocessor 20 may attempt to initiate communication with sensor display(s) and the user's assigned contents & device(s) using one or several communication protocols via near field communications such as but not restricted to, RFID, WiFi, Bluetooth, a wired connection, and/or other protocols.

The sensor suite display(s) 21, 22, may recognize and report on: inventory items such as vital static items and digital devices in the container; container system power conditions such as external power connection status, internal device coupling status, power source(s) capacity status, and other conditions as may be required; user device(s) status (such as power, message and call alerts); and/or any other enabled sensor reports. The selection of the various aspects of the information triggering the sensor suite may be customized by the individual user. As part of the interface program 36, the user may select the type and frequency of alerts displayed as well as preferences related to display functionality on sensor displays 21, 22, such as illumination intensity, colour, sequence, effect(s).

The sensor suite display(s) may be embodied through LED digital screen(s) 21, one or more LED(s) 22, and may be incorporated in various forms in, on or by the container in order to facilitate access to desired sensor alerts. The displays may be touch interactive and/or may have one or more integrated action buttons 34, to switch between sensor suites, personalize displays and/or to turn on/off. The displays' circuit may go dark after a set time of inactivity in order to preserve energy.

The wireless sensor suite display has a core box with chipset and integrated rechargeable power 28A, (and/or a low energy replaceable power source 28B). The integrated power source may be recharged through a connector such as micro USB (accessible through the slip in the back of the item 30) or any other manner appropriate to the integral power supply.

Illumination meant to facilitate access and organization may use one or a combination of programmable light source(s) such as individual LEDs, LED strips 23, LED flex panels, electroluminescence (adapted with inverter component) and/or conductive or reflective surface(s) etc. Illumination sources are not restricted to the types described herein. As part of the management interface program 36, the illumination may be customized by the user through various controls of colour, intensity, effect, timing etc.

In the system embodiment core box 20, has integrated rechargeable power. The power source(s) may be integrated 20, or separate and separately positioned in the container. Depending on the user's choice other power modes may be additionally integrated into the container in a manner appropriate for the power source. Power sources may include a set of power cords, a set of solar panels, a set of removable battery packs, and/or any other power sources that may be appropriate. The power sources are not limited to the examples described herein.

Recharging station(s) component such as USB/Mini USB connector whips 27, allow user's device(s) to be coupled for the transfer of power. Other power connector(s) may be such as but not restricted to an induction surface, magnetic block and/or other types of connectors that may be operably coupled to a device to provide power. An individual power connector may also be operably coupled to a power source in a wired or wireless manner.

FIG. 2, is a close up of installation aids on the Core Box 20. The system may be installed by tailoring into position as the seamster sees fit. Options of an adhesive/Velcro rail 31, and/or loops 29, to snap or stitch make the process faster and easier.

Figure 3:
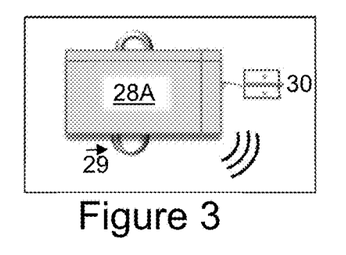
FIG. 3 Embodiments of wireless sensor suite Display(s) with integral rechargeable power core.

FIG. 3, embodies the wireless sensor suite display. This version of the sensor suite display has a core box 28A with chipset and integrated rechargeable power. The core box housing may be any shape and has loops 29, for easy attachment or install. The integrated power source may be recharged through a connector such as micro USB (accessible through the slip in the back of the item 30) or any other manner appropriate to the integral power supply.

Figure 4A:
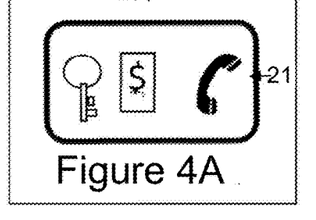
FIG. 4A Embodiment of a digital screen sensor display.
Figure 4B:
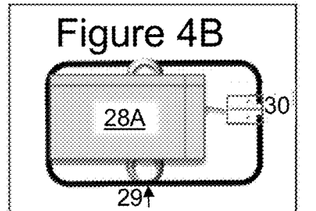
FIG. 4B Digital screen sensor display back view.

FIG. 4, is an embodiment of the digital display screen 21, (wireless core box 28A), alerts are recognized by the user through various assigned settings—in this case the inventory of vital items—phone, wallet, keys. Devices and vital items may be paired with sensors (antennae and RFID discs 25), or by any such methods (weight etc.) as to capture readings. The sensors in/on the container may trigger readings to be sent from the microprocessor to the display(s). The displays may be touch interactive and/or may have integrated action buttons to switch between sensor suites, personalize displays and/or to turn on/off. The circuit display goes dark after a set time of inactivity in order to preserve energy.

Figure 5:
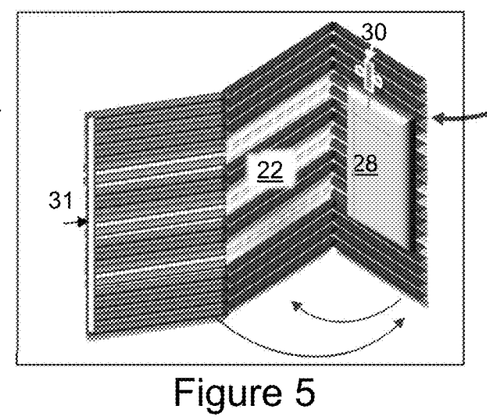
FIG. 5 Embodiment of a LED strap cuff sensor display.

FIG. 5, is an embodiment of a LED cuff format sensor display which wraps around a container's strap or belt. The wireless 28A, LED light sensor display 22, is recessed in a complementary textile/metal cuff and is affixed by Velcro 31, or other means to meet around the strap. The programmable light display 22, reacts to combinations of pre-programmed instructions to indicate readings from the sensor suite(s). The battery may be recharged through the connector accessed through the slip in the back of the cuff 30.

Figures 6A, 6B:
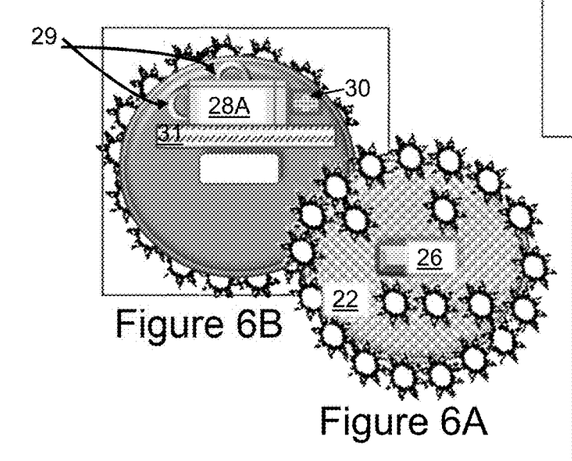
FIG. 6A Embodiment of a LED buckle sensor display.
FIG. 6B Buckle sensor display—back view.

FIG. 6A, is an embodiment of a wireless buckle format LED sensor display 22, single diodes are wired through the core box 28A and poke through the surface circumference of the novelty object (the poke pattern may vary as manipulated at the time of design). The magnetic sensor(s) 26, clicks the buckle in place—the programmable light display reacts to combinations of program instructions to indicate readings from the sensor suite(s) such as power and device status, inventory confirmation, etc.

FIG. 6B, the buckle LED sensor display may be connected to the carrier by loop 29, and/or Velcro rail 31, to the flap closure. The rechargeable battery may be accessed through the connection on the back slip 30. When sensor magnet 26, is clicked closed the light sensor display 22, may receive information. When opened the magnetic sensor 26, disengages and the internal sensor displays and/or illumination activate.

Figure 7:
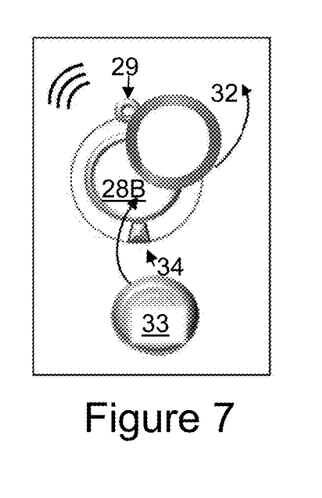
FIG. 7 Embodiments of wireless sensor suite display(s) with replaceable battery power core.

FIG. 7, is an embodiment of a wireless sensor display core box 28B, with chipset and replaceable battery 33. A small compartment flips open 32, providing access for easy battery replacement 33. The core box housing may be any shape and has loops 29, for easy attachment or install.

Small and frequent packets of information may be prompted by the sensor suite as required. The programmable sensor alerts are sent via the system's microprocessor to the wireless displays. These alerts are recognized by the user through various assigned settings and/or combination(s) of colour, intensity, blinking etc. on light display 22. The LED sensor display(s) 22, may have integrated action buttons to switch between sensor suites, personalize displays and/or to turn on/off 34. The display circuit goes dark after a set time of inactivity in order to preserve energy.

Figure 8A:
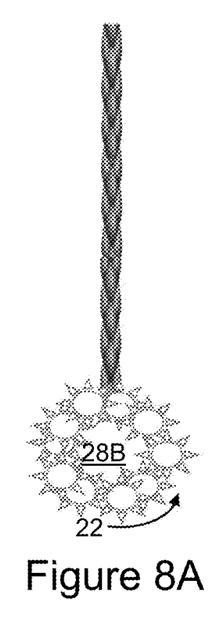
FIG. 8A Embodiment of a LED multi light sensor display.

FIG. 8A, is an embodiment of a LED 22, (may be any shape or cluster), wireless 28B, sensor display. Although the display may be attached anywhere in or on the container by any means, this display is attached by the supplied loop 29, to a strap.

Figure 8B:
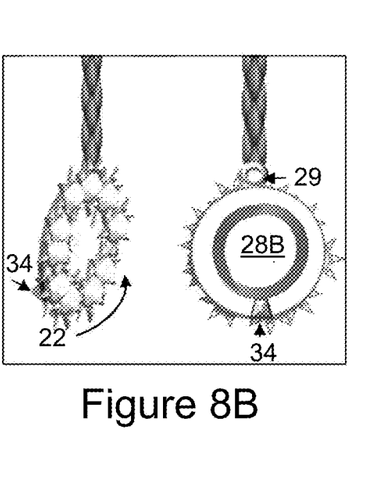
FIG. 8B LED multi light sensor display—back view.

FIG. 8B, The back view of the sensor display 22, shows the 28B, core box with a Flip mechanism 32, to access the replaceable battery 33. (The button back slides up to expose coin battery for retrieval.) An optional button control 34, may switch between sensor readings and/or turn the LED light on/off.

Figure 9:
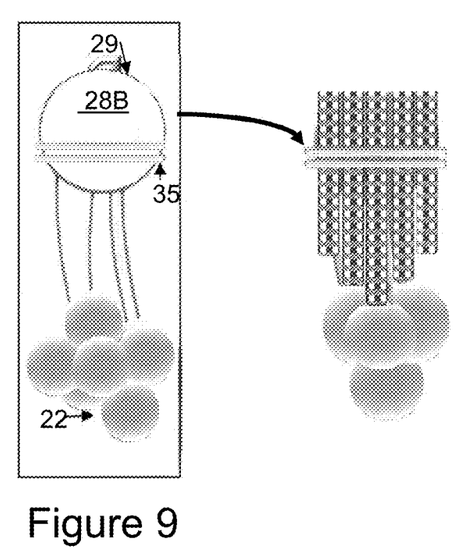
FIG. 9 Embodiment of a LED strap end sensor display.

FIG. 9, is an embodiment of a wireless LED sensor display 22, (may be any size And shape). Individually the LED ball chords may be attached to container strap braids or left to dangle. The core control box 28B, may be secured to the container strap by, amongst other means, loop 29, or clamp 35 (the strap extension may be fed through to secure). The lights are programmed to react to various alerts and display information through user's preferred colour, intensity and blinking combinations.

Figures 10, 11, 12:
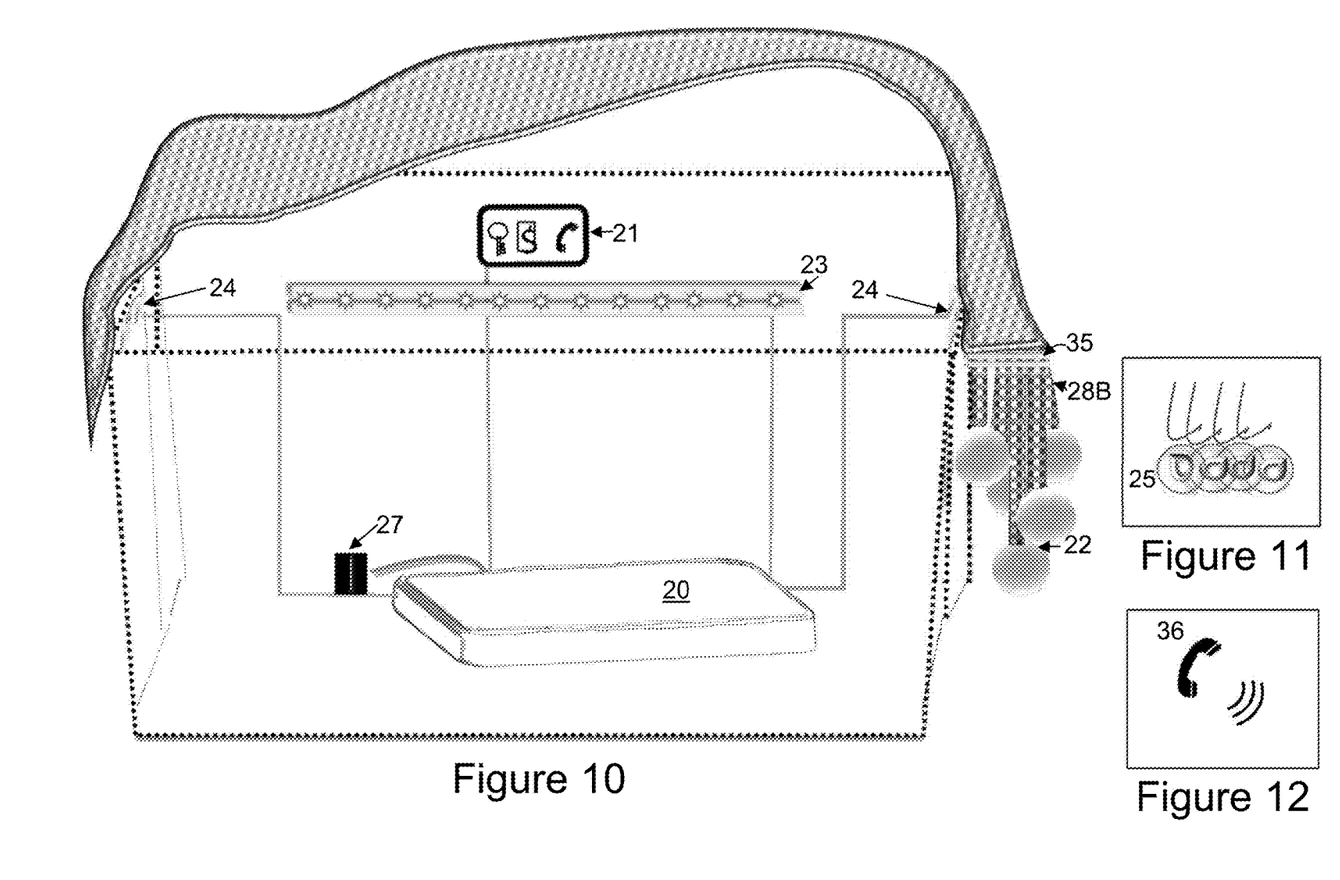
FIG. 10 Embodiment of an upgrade to a medium sized personal portable container.
FIG. 11 Close-up RFID Sensors.
FIG. 12 In reference to management interface.

FIG. 10, demonstrates an embodiment of an Adaptable Technological Suite Upgrade installation in a medium sized personal portable container. The purse is post production. The self-contained system may be installed directly without a lining or as in this example behind the lining. The alteration would be completed as an upgrade in-store at time of purchase or as an alteration service after. A seam of the purse lining has been opened to install the components: the core box 20 has been positioned at the bottom, the flex sensors 24 have been installed in the side gussets, two small incisions are made to expose power whips 27 and sensor suite 21, a programmable LED strip has been put into place at the top of the container (although it can be put anywhere in the purse—side, bottom opposite side, middle etc.) behind the lining, sensor suite display digital screen 21 is set above the light strip and on top of the lining—in this instance it is hard wired.

FIG. 11, Additional RFID antennas 25, may be added as needed depending on the size and location of organizational pockets. Vital static items may be coupled to RFID Sensors to be inventoried by the sensor suite.

FIG. 12, The tailor adds finishing touches and the user may now download the management program and begin to personalize their contents and how they will be viewed and identified. The user may set the illumination colour, intensity and effect, refine the sensor suite and charge their device(s).

The Adaptable Technology Suite system upgrade allows the organization of the purse to be responsive and in effect the container now functions as a smart object.

Figure 13:
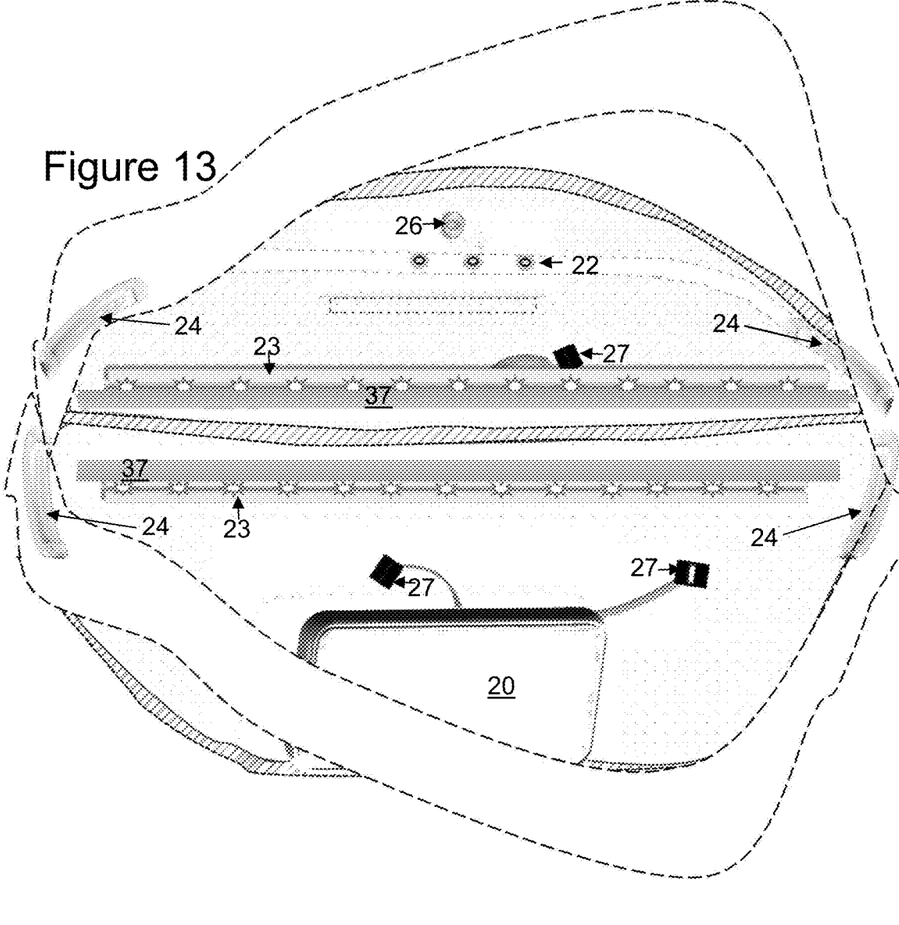
FIG. 13 Embodiment of an upgrade to a personal portable container with two organizational sides.

FIG. 13 is an embodiment of a personal portable container with two organizational sides. The overhead view illustrates 2 LED illumination strips 23, with visor* aids 37. In this instance the system is installed to maximize organization for two compartments—each may have its own colour and intensity illumination settings so as to maximize user's immediate orientation when accessing. The power whips 27 are on both sides of center in order to maximize access of multiple devices. The LED sensor suite indicator display 22 is positioned in the top back interior of the case. (The sensor display is comprised of individual Diodes which may be personalized for colour, intensity and effect in order to present combinations of alerts set by the various sensor readings.)

Figure 14:
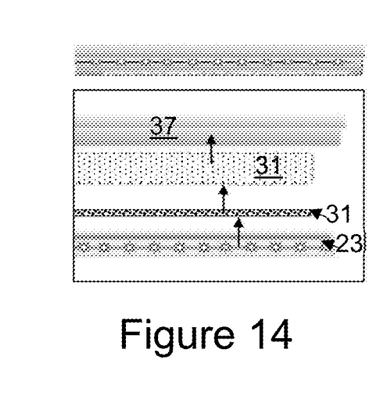
FIG. 14 Close-up optional installation method.

FIG. 14, the system may be installed by tailoring into position as the seamster sees fit. In this instance a solution for installation of the illumination strips is offered in the form of a tailoring pattern for a *visor with attachment backing. The close up is of an optional directional *visor strip 37, which may be tailored from any complementary material and backed with adhesive or Velcro 31, to aid in installation.

The tailor adds finishing touches and the user may now download the management program and begin to personalize their contents, illumination, sensor suites and power and device stats. The system upgrade allows the organization of the purse to be responsive and in effect the container now functions as a smart object.

Figure 15:
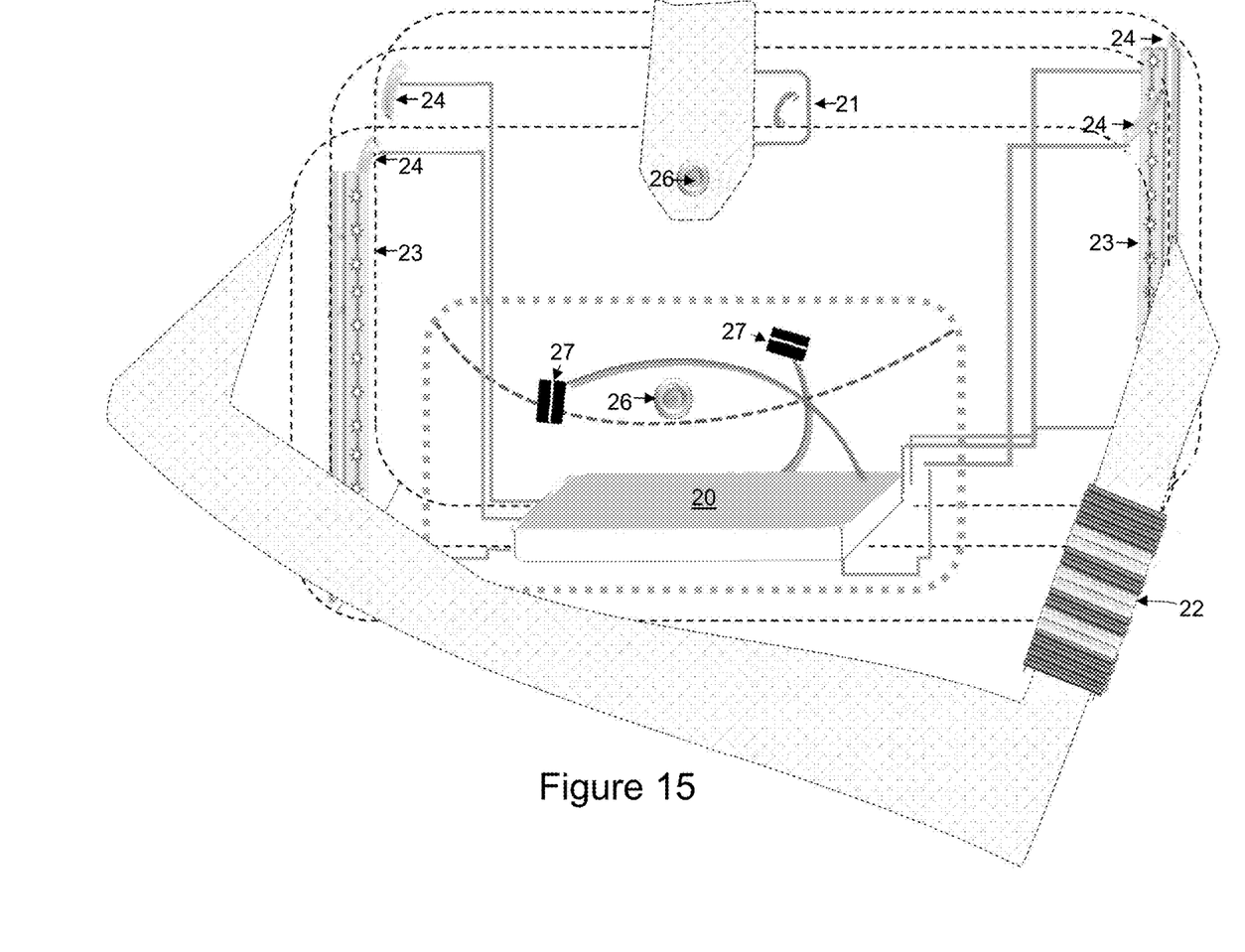
FIG. 15 Embodiment of an upgrade to a multi organizational personal portable container.

FIG. 15, is an embodiment of a technological suite upgrade to a multi organizational personal portable container. The core box 20, may stay at the bottom of the carrier or in one of the sides, sensors such as flex 24, are positioned in the gussets of the container and magnetic sensors 26, at top of container and at front pocket, in order to respond to the opening and closing movement. The Light strips 23, are positioned down the inside of the gussets in order to illuminate deeper. Each area may have its own illumination effect to aid in organization. Power whips 27, are placed in the front compartment of the container allowing the option of extending a power source to reach just outside of the bag. Additional antennae 25, may be positioned in the pockets and compartments (such as but not restricted to Bluetooth and/or RFID markers) to identify presence of vital items such as but not restricted to phone, wallet, and keys. Sensor(s) display 22, is mounted on the purse strap. The sensor cuff display functions wirelessly and can be used to confirm alerts without examining the insides of the carrier.

Figure 16:
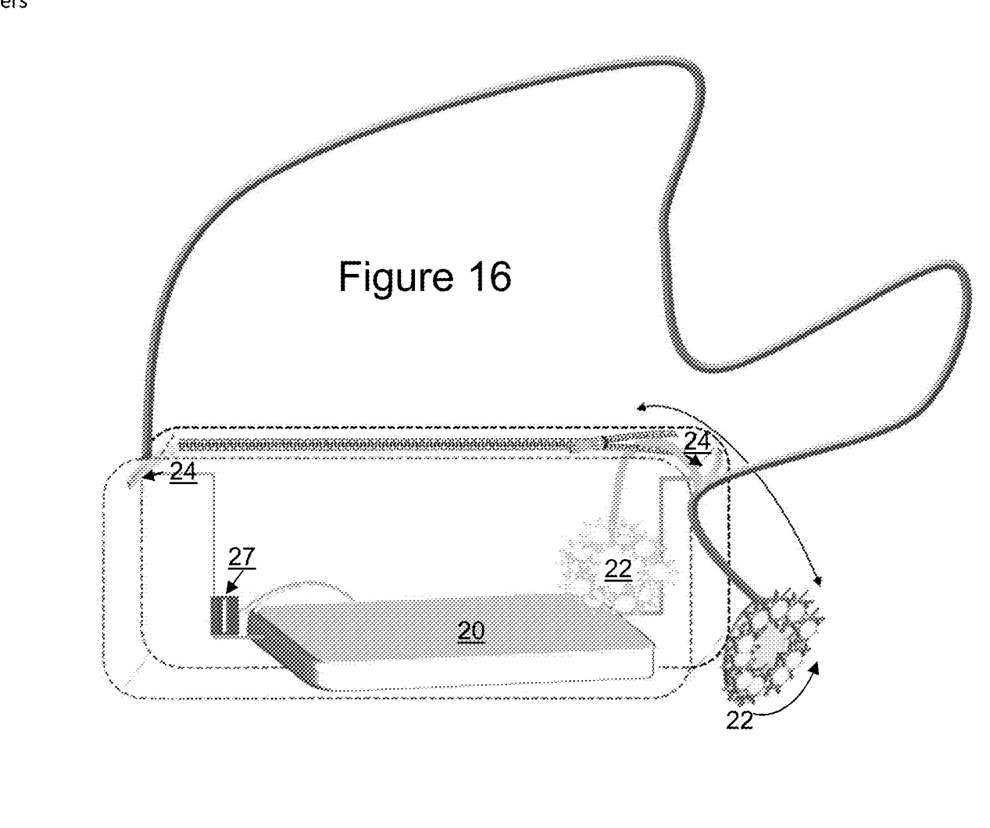
FIG. 16 Embodiment of an upgrade to a mini organizational personal portable container.

FIG. 16, is an embodiment of a mini organizational shoulder sling carrier. The core box 20 is placed in the bottom of the container, flex sensors are placed on either inside corner 24, Power connector whips 27, are positioned in the inside pocket and a sensor(s) display 22, is hung on the strap purse junction in order to facilitate easy visual access and to flip inside the carrier when light is required.

Figure 17:
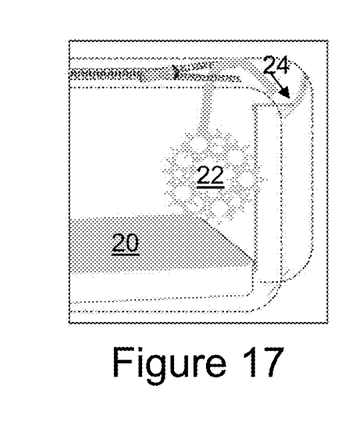
FIG. 17 Detail multi light sensor display serving double duty.

FIG. 17, illustrates how the sensor display functions as illumination ON when the container's zipper is opened (allowing user to use the flipped display 22, as illumination inside of container) and stands by outside for sensor display alerts when carrier is closed. Illumination function shuts down after a designated time without action to save energy.

Figure 18A:
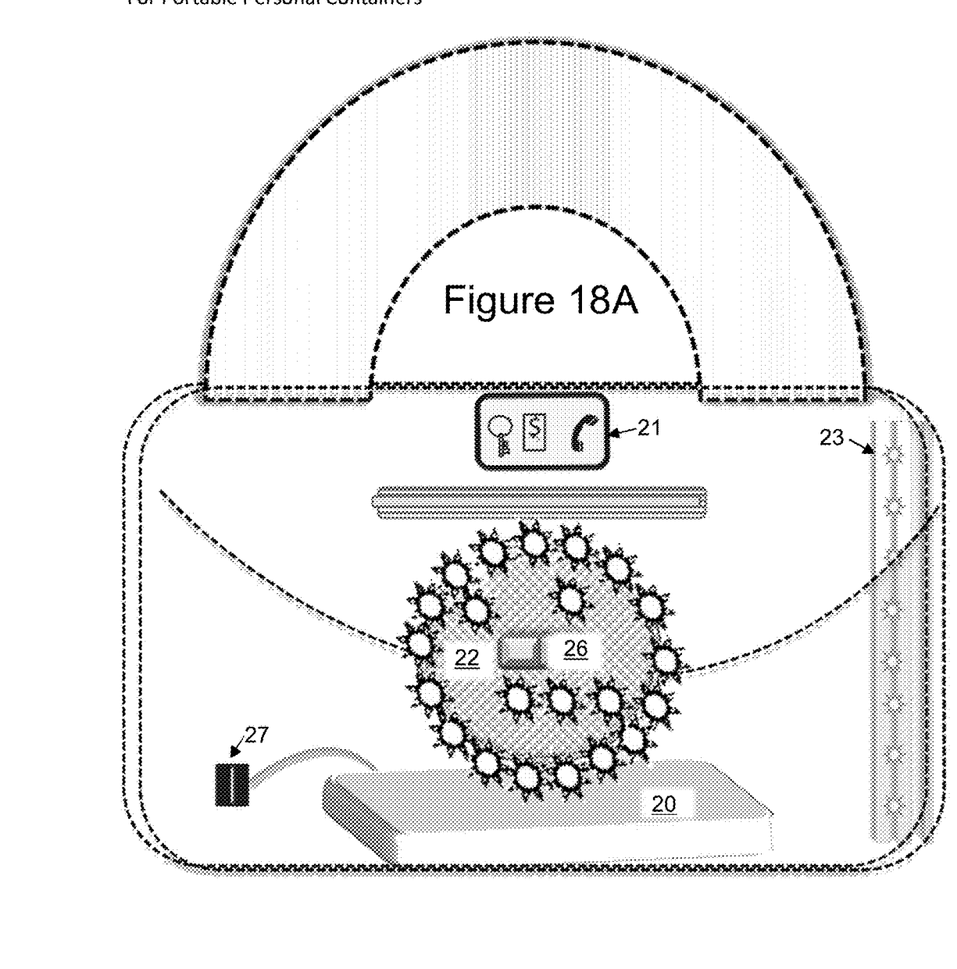
FIG. 18A Embodiment of an upgrade to a box purse personal portable container.

FIG. 18A, is an embodiment of an upgrade to a box purse portable container. The core box 20, is placed in the bottom of the container with the power whips 27. Positioned inside the back above the pocket is a digital sensor(s) display 21, which may allow visual confirmation of contents etc. Illumination strip 23, is set on the side. The buckle sensor display 21, may be attached with the Velcro rail 31, and/or stitched in place using the supplied loops 29, the buckle display is rechargeable through the slip in the back of the unit 30.

Figure 18B:
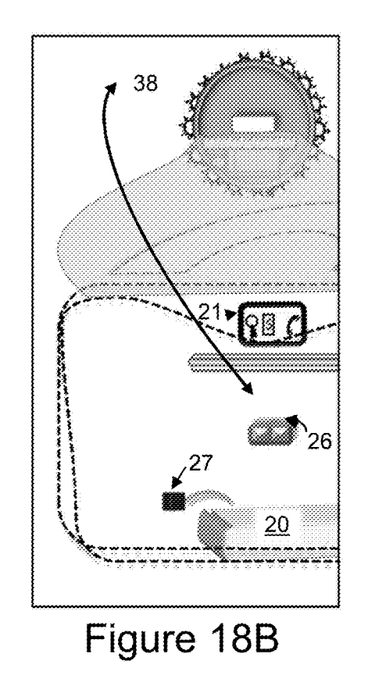
FIG. 18B Detail Box Purse opening.

FIG. 18B, illustrates when the purse is clicked open 38, the magnetic sensor 26 (comprised of 2 parts one in the button clips on the purse and the second in the buckle) disengages. The interior illumination 23, and digital display activate. When the purse is clicked closed the magnet 26, connects the LED buckle sensor display 22, sensor readings may be received through set combinations of LED diodes (sequence, pattern etc.) Sensor information such as energy levels, device status, purse inventory etc.

The user may download the system management interface to personalize the features and effects. The updated portable personal container may function as a smart object.

The above disclosure describes a number of embodiments of the Adaptable Technology Suite System Upgrade. For purposes of explanation, certain examples are described with reference to the components illustrated in FIGS. 1-18. The functionality of the illustrated components may overlap and may be present in a fewer or greater number of elements and components. All or part of the functionality of illustrated elements may co-exist or be distributed among several compartment/surface locations. Additional or fewer operations or combinations of operations may be used or may vary without departing from the scope of the disclosed examples. The present disclosure merely sets forth possible examples of implementations, and many variations and modifications may be made to the described examples. All such modifications and variations are intended to be included within the scope of this disclosure and protected by the following claims.

We claim:

1. An adaptable technological suite upgrade for portable personal containers comprising: an electronic system with;
   one or more direct current storage devices with recharging assemblies;
   a microcontroller (with one or more microprocessors) which through the use of one or several onboard communication protocols via near field communications such as but not restricted to Wi-Fi, RFID, Bluetooth, a wired connection, and/or other protocols recognizes and communicates with components, devices and static items within, on and by the carrier;
   a downloadable system management interface, part of an application or applications already installed on Random Access Memory (RAM) and/or an Electrically-Erasable Programmable Read-Only Memory (EEPROM), allowing communication with the user's device(s) and personalization of components' affects;
   and a selection of electronic component modules; wherein sensor suite(s) which may:
   1. inventory important static items and digital device(s) contained in/on the portable personal carrier;
   2. provide customized user prompts relating to user device(s) indicating preferred critical data;
   3. provide information on the operations and status of the electronic system;
   4. and any other additional sensor information collected as may be designated;
   wherein the sensor suite(s) further include one or more sensor displays such as but not limited to LED digital screens, sets of indicator lights, or any other display format (wired or wireless) in, on, or in proximity to the portable personal container which may:
   1. be touch interactive and/or may have integrated action buttons to switch between sensor suites, personalize displays and/or to turn on/off;
   2. be managed through the system management interface which may include but are not limited to options of image, colour, intensity, motion, timing etc.;
   3. turn off after a set time of inactivity in order to preserve energy;
   4. indicate various assigned readings sent from the sensor suite which may include but are not limited to:
      digital device(s) status alerts such as charged power, pending message, incoming call, etc.;

detection/inventory of (static and electrical) items in/on container;

status of electronic system power level—charging, full, etc.

2. The adaptable technological suite of claim 1, wherein including Illumination assemblies comprised of one or more light sources such as but not limited to LED's, electroluminescence, conductive/reflective surface, or other which may provide programmable illumination and/or colour organization and/or expressive design.

3. The adaptable technological suite of claim 1, wherein including recharging station(s) providing access to the system power source(s), by one or more access modes such as but not limited to wireless, USB, magnetic, etc., for user electrical devices when coupled to the system.

4. The adaptable technological suite of claim 1, wherein including activation sensors comprised of but not limited to one or more flex, touch, magnetic etc., which respond organically in order to trigger components to ON and de-activate (sleep) if no designated motion or interaction is sensed for a predetermined amount of time.

5. The adaptable technological suite of claim 1, further comprising extended electronic wiring connections ample to allow for the various components' integration for various carrier designs and/or be wireless electronic transmission enabled.

6. The adaptable technological suite of claim 1, further comprising assembly of loops and/or snaps and/or Velcro rails and/or visor adapters on system modules to accommodate tailoring and attachment.

\* \* \* \* \*